(12) United States Patent
Ahnfeldt (10) Patent No.: US 10,512,977 B2
(45) Date of Patent: Dec. 24, 2019

(54) CUTTING INSERT AND A CUTTING TOOL FOR MILLING SQUARE SHOULDERS

(71) Applicant: SANDVIK INTELLECTUAL PROPERTY AB, Sandviken (SE)

(72) Inventor: Tomas Ahnfeldt, Gavle (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 90 days.

(21) Appl. No.: 15/527,775

(22) PCT Filed: Nov. 2, 2015

(86) PCT No.: PCT/EP2015/075396
§ 371 (c)(1),
(2) Date: May 18, 2017

(87) PCT Pub. No.: WO2016/078897
PCT Pub. Date: May 26, 2016

(65) Prior Publication Data
US 2017/0320146 A1    Nov. 9, 2017

(30) Foreign Application Priority Data
Nov. 20, 2014    (EP) .................................... 14194024

(51) Int. Cl.
*B23C 5/20* (2006.01)
*B23C 5/22* (2006.01)
*B23C 5/10* (2006.01)

(52) U.S. Cl.
CPC ............ *B23C 5/2221* (2013.01); *B23C 5/109* (2013.01); *B23C 2200/0416* (2013.01);
(Continued)

(58) Field of Classification Search
CPC ..... B23C 5/2221; B23C 5/109; B23C 5/2213; B23C 2200/125; B23C 2200/126;
(Continued)

(56) References Cited

U.S. PATENT DOCUMENTS 6,929,427 B2 *  8/2005  Satran ..................... B23C 5/109
                                                          407/113
2011/0027027 A1   2/2011  Hatta

FOREIGN PATENT DOCUMENTS

EP    1509353 B1    12/2006
EP    1952925 A2    8/2008
(Continued)

*Primary Examiner* — Alan Snyder
(74) *Attorney, Agent, or Firm* — Corinne R. Gorski (57) ABSTRACT

A cutting insert for milling square shoulders has side surfaces each provided with a major cutting edge connected to an associated wiper edge on an adjacent side surface of the insert. The side surface provided with the major cutting edge has two generally flat and non-coplanar support surfaces arranged consecutively with respect to a direction of the extension of the major cutting edge and make different angles with a normal to a bottom surface of the insert. A border forming a limit of the support surfaces most distant to the bottom surface is inclined with respect to the bottom surface so that the distance of this border to the bottom surface increases in a direction of extension of the cutting edge towards the wiper edge.

19 Claims, 5 Drawing Sheets (52) U.S. Cl.
CPC .. *B23C 2200/126* (2013.01); *B23C 2200/208* (2013.01); *B23C 2210/168* (2013.01)

(58) Field of Classification Search
CPC ........ B23C 2200/168; B23C 2200/208; B23C 2210/168
See application file for complete search history.

(56) References Cited

FOREIGN PATENT DOCUMENTS

| | | |
|---|---|---|
| EP | 2070620 A1 | 6/2009 |
| EP | 2764938 A1 | 8/2014 |
| JP | 2006062048 A | 3/2006 |
| WO | 96/29172 A1 | 9/1996 |
| WO | 03/101654 A | 12/2003 |
| WO | WO 03101654 A1 * 12/2003 | ............. B23C 5/109 |
| WO | 2004/101235 A | 11/2004 |

* cited by examiner

CUTTING INSERT AND A CUTTING TOOL FOR MILLING SQUARE SHOULDERS

RELATED APPLICATION DATA

This application is a § 371 National Stage Application of PCT International Application No. PCT/EP2015/075396 filed Nov. 2, 2015 claiming priority of EP Application No. 14194024.7, filed Nov. 20, 2014.

TECHNICAL FIELD OF THE INVENTION

The present invention relates to a cutting insert for milling square shoulders according to the preamble of claim 1, a cutting tool provided with such an insert for milling square shoulders as well as a tool body for such a milling tool.

Such a cutting insert is indexable between at least two index positions when received in an insert pocket of a milling cutting tool for milling square shoulders. The invention is not restricted to any diameter range of such a milling cutting tool, but a diameter of 20-40 mm is typical for milling square shoulders in metal pieces, although the diameter may be as small as approximately 10 mm or as large as 160 mm or even larger. Such a milling cutting tool has normally a plurality of said pockets to which a said cutting insert is releasably fixed.

It is for the result of the chip-removing machining carried out by said milling tool of vital importance that a said cutting insert is properly supported in a fixed position in a said insert pocket. It is at the same time important to design such an insert and the support surfaces thereof so that no part of the insert will be damaged by the milling machining carried out degrading the result of the machining, damaging the exposed support surfaces or side surfaces of the insert, and/or requiring a premature replacement of the insert. Said support is mainly to be provided to side surfaces of the insert in a substantially radial direction with respect to the rotation axis of a said cutting tool, but it has of course also to be ensured that the insert may not move in the axial direction when fixed in an insert pocket of a rotating tool body.

BACKGROUND ART

EP 1 509 353 B1 discloses a cutting insert for milling square shoulders of the type defined in the introduction. An advantage of this insert with respect to other known inserts being curved at the side surfaces provided with opposing major cutting edges and for that sake having curved support surfaces is that the two generally flat and non-coplanar support surfaces will press against larger faces on an insert pocket. This means that the insert will be more stable in the insert pocket than would only a small part of the insert press against faces or even points of the pocket as for a curved design. The two support surfaces, which will form radial supports, of the insert disclosed in this publication make different angles with a normal to the bottom surfaces of the insert for trying to consider forces acting on cutting edges thereof when determining the radial support to be provided through the respective support surface. Although this cutting insert has favourable features there is of course an ongoing attempt to improve the properties of an insert of this type, especially with respect to a combination of stable support in an insert pocket of a milling cutting tool and long lifetime of the insert.

SUMMARY OF THE INVENTION

The object of the present invention is to provide a cutting insert, a milling cutting tool and a tool body of the type defined in the introduction being improved in at least some aspect with respect to such cutting inserts, milling cutting tools and tool bodies already known.

This object is with respect to the cutting insert obtained by providing such a cutting insert with the features listed in the characterizing part of appended claim 1.

By the inclination of said upper border of the support surfaces so that the distance of this border to the bottom surface of the insert increases in the direction of the extension of the major cutting edge towards the wiper edge associated with this major cutting edge it will be possible to correspondingly incline the support line along which said support surfaces will have the upper limit of the support received by parts of a said insert pocket, which in its turn results in a possibility to design the respective said major cutting edge with a larger inclination with respect to the bottom surface improving the cutting process and by that the quality of the "vertical" or "90 degree" wall created by the major cutting edge. The possibility to increase said distance of the support line between the insert and portions of an insert pocket of a cutting tool through said inclination will make the support surface closest to the associated wiper edge under the inactive major cutting edge to support radial cutting forces better than would this support line be at the same distance from said bottom surface as the distance between the support line and the side surface of the insert most distant to said wiper edge resulting in an improved quality of the vertical wall created in a work piece subjected to square shoulder milling by use of this cutting insert. It is particularly advantageous to have said support line at an increased distance to the bottom surface when the cutting depth of the tool increases causing an increase of forces acting on the insert.

According to an embodiment of the invention the inclination of said upper border with respect to said bottom surface is 2°-10°, 3°-7° or 4°-6°. A said inclination within these ranges is suitable for combining a proper support of the insert received in an insert pocket with high quality of the result of the milling action carried out by the insert.

According to another embodiment of the invention the inclination of said upper border with respect to said bottom surface is larger, such as 1°-4° or 1°-2° larger, for each said support surface most distant to the respective wiper edge than for the respective support surface closer to said wiper edge.

According to another embodiment of the invention each said support surface of the side surface provided with a major cutting edge most distant to the wiper edge associated with the respective major cutting edge makes a larger angle with a normal to said bottom surface than the respective support surface closer to said wiper edge. This means that said support surface closest to the wiper edge will under the inactive major cutting edge give a better radial support than the other support surface. The support surface will thereby reduce the tendency of the insert to be lifted out of the insert pocket during milling. At higher cutting depths the radial cutting forces on the insert increases at the same time as the points of action move upward and are thereby directed more and more toward this support surface. A smaller angle on the support surface closest to the wiper edge also provides a better support below an active major cutting edge at a portion closest to the wiper edge, which is important due to that portion most often being used for cutting and subjected to the greatest strains. On the other hand the other support surface most distant to the wiper edge and located under the active major cutting edge has a larger angle to provide sufficient clearance and protection from being damaged by the material of the machined workpiece. More precisely, this support surface is more susceptible to be damaged by hitting against the material of the workpiece machined when the insert is arranged at a positive axial angle in the insert pocket of the milling tool. Furthermore, the support surface first mentioned with a smaller angle with respect to said normal may be provided with its upper border further away from the major cutting edge. This is preferred since this part of the major cutting edge close to the associated wiper edge is exerted to the highest forces during machining and the temperature thereof will by that be the highest. Thus, the temperature of that support surface may then be lowered and it will be less exposed to erosion, dirt and chips or the like sticking thereon and by that receive a better durability.

According to another embodiment of the invention said support surfaces make angles with a normal to said bottom surface >8° or >10°. Such large angles of these support surfaces with said normal results in a possibility to omit a chamfering close to the bottom surface for obtaining a lower clearance surface, which means that the design and manufacturing of the insert will be less complex. This possibility is also the subject of another embodiment of the invention, in which all said support surfaces extend to said bottom surface.

According to another embodiment of the invention each said support surface of the side surfaces provided with a major cutting edge closest to the wiper edge associated with a respective major cutting edge makes an angle with a normal to said bottom surface <15° or <12°. The angle made by these support surfaces with respect to said normal enables a good radial support, while allowing a sufficient separation of these support surfaces from the major cutting edge where this is exerted to the highest forces during machining and still achievement of a sufficient support to that portion of the active cutting edge.

According to another embodiment of the invention each said support surface of the side surfaces provided with a major cutting edge most distant to the wiper edge associated with the respective major cutting edge makes an angle with a normal to said bottom surface ≥15° or 15°-23° or 17°-20°. These support surfaces are located where the major cutting edge is less exposed to high forces during machining, but the risk of collision with parts of the material piece machined is higher and requires a larger clearance. However, these angles makes it possible to obtain the necessary clearance even if the support surface in question extend to the bottom surface of the insert.

According to another embodiment of the invention each said support surface of the side surfaces provided with a major cutting edge most distant to said wiper edge associated with the respective major cutting edge is inclined toward a longitudinal symmetry plane of the insert as seen in a direction of the extension of the respective said major cutting edge away from its associated wiper edge. "Symmetry plane" means here a plane extending perpendicularly to the bottom surface of the insert and dividing the insert into equal parts. This feature results in an optimizing of the clearance of the part of these support surfaces where a clearance is of most importance.

According to another embodiment of the invention being a further development of the embodiment last mentioned each said support surface inclined towards said symmetry plane is inclined at an angle of 1°-4° or 1°-2° with respect to said symmetry plane, which a suitable inclination for obtaining the advantage just mentioned.

According to another embodiment of the invention also each said support surface of the side surfaces provided with a major cutting edge closest to said wiper edge is inclined towards said symmetry plane as seen in a direction of the extension of the respective said major cutting edge toward its associated wiper edge, which results in an optimal support below the active major cutting edge, yet a similar advantage with respect to the providing the necessary clearance below the major cutting edge close to said wiper edge.

According to another embodiment of the invention only one of said pairs of opposing side surfaces is provided with two said opposing major cutting edges and these two side surfaces form major side surfaces, the two other side surfaces form minor side surfaces, and each said minor side surface comprises at least one generally flat support surface. This means that the insert will be indexable between two index positions and an axial support in an insert pocket of a cutting tool may be formed by said support surface on each said minor side surface.

According to an embodiment of the invention said support surface of each said minor side surface is located more distant to an end of said minor side surface having a wiper edge than an opposite end of this minor side surface. This support surface is by that moved away from regions of the insert exposed to high cutting forces during machining carried out by the insert.

According to another embodiment of the invention each said major cutting edge has a slight camber by having a convex extension as seen perpendicularly to said bottom surface. This results in a possibility to obtain a wall surface of a square shoulder without any sharp edges in case of moving a tool body axially for milling in consecutive planes located at an increased depth in a working piece when producing a said square shoulder.

The object of the present invention is with respect to the milling cutting tool obtained by providing such a tool with at least one cutting insert according to the present invention and the further features of the independent claim directed to a milling cutting tool. The advantages of such a milling cutting tool appear clearly from the above discussion of a cutting insert according to the invention and the embodiments thereof.

According to an embodiment of the invention said forward radial contact surface and said rear radial contact surface of each insert pocket of said tool have a border forming a limit of these support surfaces most distant to said base at a distance to said base being less than a distance of the corresponding border forming a limit of said support surfaces of each said insert side surface most distant to said bottom surface thereof to this bottom surface, such as being 80%-95% of the latter distance. This ensures that in spite of some tolerances the support given by said forward radial contact surface and said rear radial contact surface to said insert will be within support surfaces of said insert and in no way thereabove, which could make the support unstable. However, it is desired to have an upper support line provided by said forward radial contact surface and said rear radial contact surface upon support surfaces of the insert as far away as possible from the bottom of the insert to obtain a maximum radial support.

According to another embodiment of the invention said forward radial contact surface and said rear radial contact surface of said insert pocket make an angle with a normal to said base being smaller than the angle made by a said insert support surface to be pressed thereagainst with a normal to said insert bottom surface such as by being ≥0.5° or 0.5°-2° smaller than that angle. This ensures that the upper border of said forward and rear radial contact surfaces of the insert pocket will contact the corresponding support surfaces on the insert along a support line avoiding abutment and support only at points.

According to another embodiment of the invention said rear wall of the insert pocket comprises a generally flat axial contact surface configured to form an axial support to an insert according to the invention resulting in a stable sit of the insert in a said insert pocket.

According to another embodiment of the invention said insert pocket is configured to receive a said insert having a central axial through-hole for securing it in the pocket by a screw, and the base of the pocket has a threaded bore for receiving a said screw located slightly offset with respect to said through-hole of the insert enabling said screw to urge support surfaces of the insert to bear under pretention against contact surfaces of the pocket when the screw is tightened and the bottom surface of the insert is pressed against said base of the pocket. This offset ensures that the support surfaces of the insert will really be supported by contact surfaces of the insert pocket when the insert is fixed in said pocket.

The object of the present invention is with respect to the tool body for a milling cutting tool obtained by providing such a tool body with the features of the independent claim directed to such a tool body. The advantages of such a tool body and embodiments thereof appear from the above discussion of a milling cutting tool according to the invention and the embodiments thereof.

Other advantageous features as well as advantages of the present invention appear from the description following below.

BRIEF DESCRIPTION OF THE DRAWINGS

With reference to the appended drawings, below follows a specific description of embodiments of the invention cited as examples.

In the drawings.

DETAILED DESCRIPTION OF EMBODIMENTS OF THE INVENTION

Figure 1:
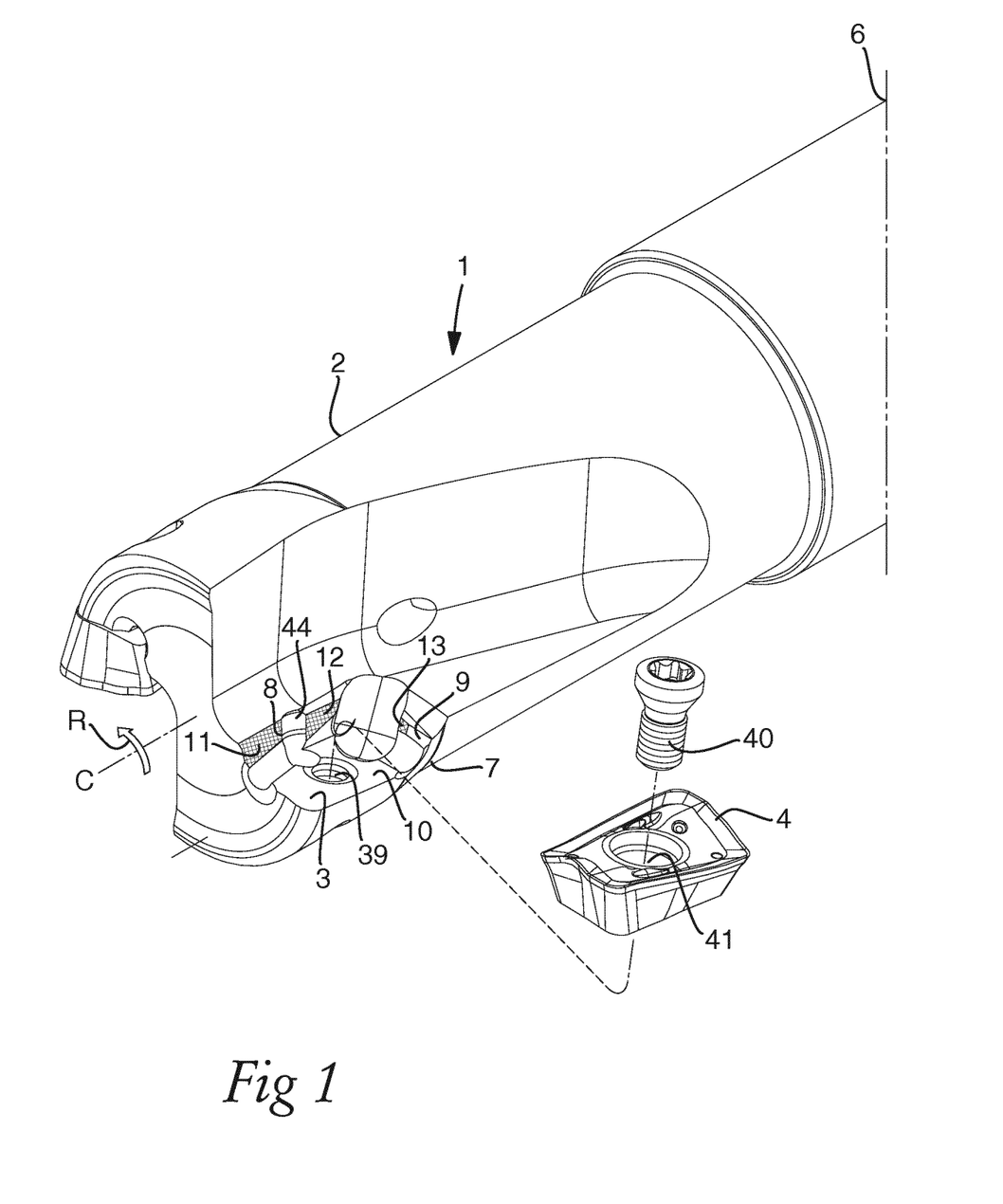
FIG. 1 shows a perspective view of a tool for milling square shoulders as well as a cutting insert according to a first embodiment of the invention.
Figure 2:
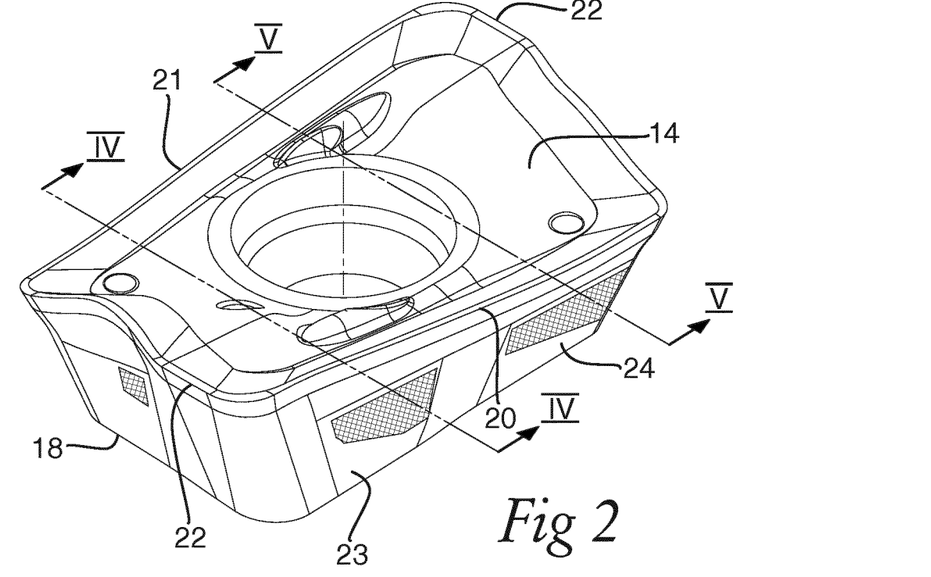
FIG. 2 shows an enlarged perspective view obliquely from above of the cutting insert shown in FIG. 1.
Figure 3:
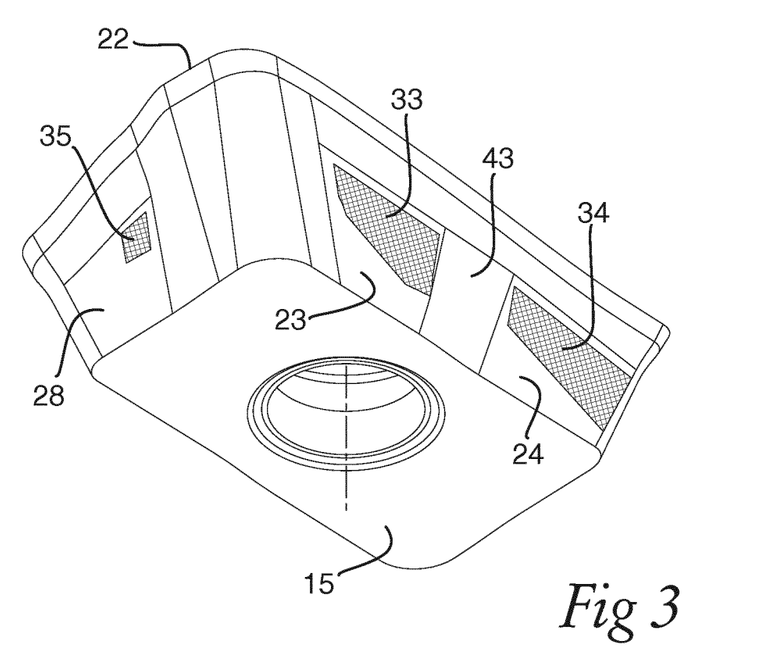
FIG. 3 shows a perspective view obliquely from below of the cutting insert shown in FIG. 2, FIG. 4 and FIG. 5 are cross-section views of the cutting insert shown in FIG. 2 along the lines IV-IV and V-V, respectively.

A milling cutting tool 1 for milling square shoulders according to an embodiment of the invention is shown in FIG. 1. The tool has a tool body 2 having two seats or pockets 3 for each receiving a cutting insert 4 according to the invention releasably fixed to the pocket. The tool body is in the form of an end mill having a cylindrical basic shape, but the tool body may have another shape in the form of for instance a shoulder face mill. The cutting insert 4 is removed from the pocket 3 for illustrating the structure of the pocket. The tool body 2 includes a front end 5 and a rear end 6 between which a central rotation axis C extends around which the tool is rotatable in a direction of rotation R. The pockets 3 are formed in a transition between the front end 5 and an envelope surface 7 extending between the front end 5 and the rear end 6 of the tool body.

The insert pocket 3 comprises adjacent side 8 and rear 9 walls generally transverse to a flat base 10. The side wall 8 is provided with two generally flat and non-coplanar radial contact surfaces arranged consecutively along the direction of said rotation axis C in the form of a forward radial contact surface 11 and a rear radial contact surface 12 making different angles with a normal to the base 10, which will be explained in further detail below. Also the rear wall 9 of the pocket 3 comprises a generally flat axial contact surface 13 configured to form an axial support to an insert 4 received in said pocket, while radial supports to a said insert is formed by the radial contact surfaces 11 and 12.

A cutting insert 4 for milling square shoulders according to a first embodiment of the invention will now be described while making reference simultaneously to FIGS. 2-8. The cutting insert may typically be made of cemented carbide comprising wear resistant coatings. The cutting insert comprises a top surface 14, a bottom surface 15 and a peripheral side surface extending therebetween and formed by two pairs of opposing side surfaces, namely two opposing major side surfaces 16, 17 and two opposing minor side surfaces 18, 19. The major side surfaces are provided with two opposing major cutting edges 20, 21 at the intersection of the respective major side surface with the top surface, whereas the minor side surfaces are provided with two opposing wiper edges 22 at the intersection of the respective minor side surface with the top surface. Each respective wiper edge 22 is connected to its associated major cutting edge 20 and 21 at one end of the respective side surface via a corner edge.

Figure 4:
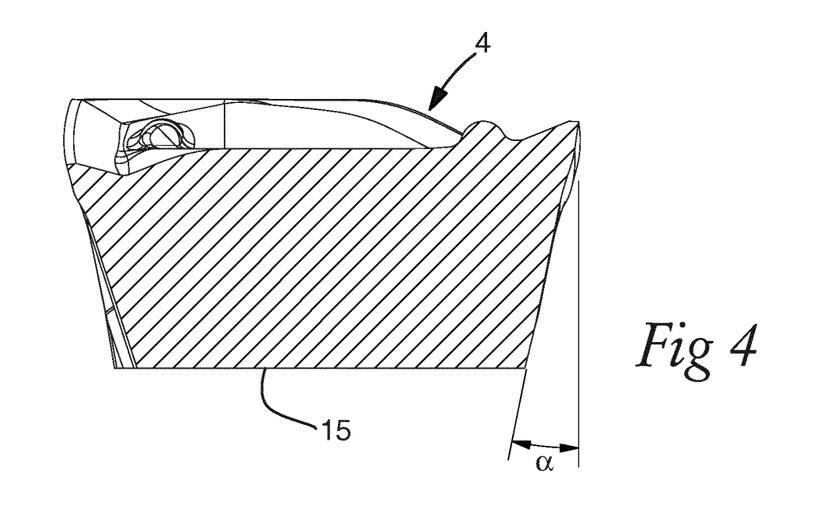
Figure 5:
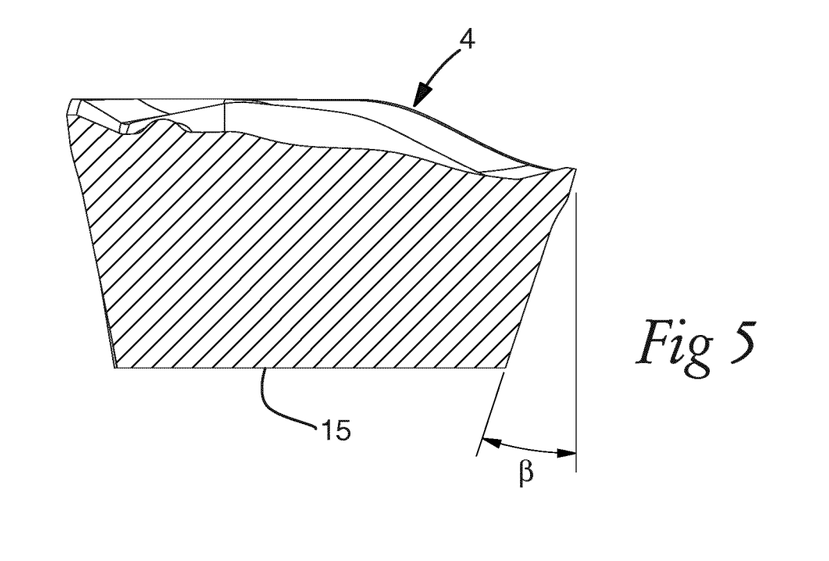

Each of the two major side surfaces 16, 17 comprises two generally flat and non-coplanar radial support surfaces 23-26 arranged consecutively with respect to a direction of the extension of the respective major cutting edge 20, 21. These radial support surfaces make different angles with a normal N to the bottom surface 15 of the insert. This is illustrated in FIGS. 4 and 5 showing the angle $\alpha$ made by the radial support surface 23 closest to the wiper edge associated with a respective major cutting edge 20 and the angle $\beta$ made by the radial support surface 24 most distant to said wiper edge 22. It is shown that the angle $\alpha$ made by the support surface 23 is smaller than the angle $\beta$ made by the support surface 24, i.e. 11° with respect to 18°, which means that the radial support surface 23 will provide a better radial support when the cutting edge 20 is in an inactive state, which means that the upper limit of said support surface 23 may be placed lower than would the angle $\alpha$ be larger. This means that the support surface 23 may be moved further away from the major cutting edge 20 exactly where the forces on the major cutting edge will be the highest in the active milling state thereof. A larger angle $\beta$ of the support surface 24 avoids risks of collision with a material piece machined and both angles $\alpha$ and $\beta$ provide sufficient clearances at the respective location.

Figure 6:
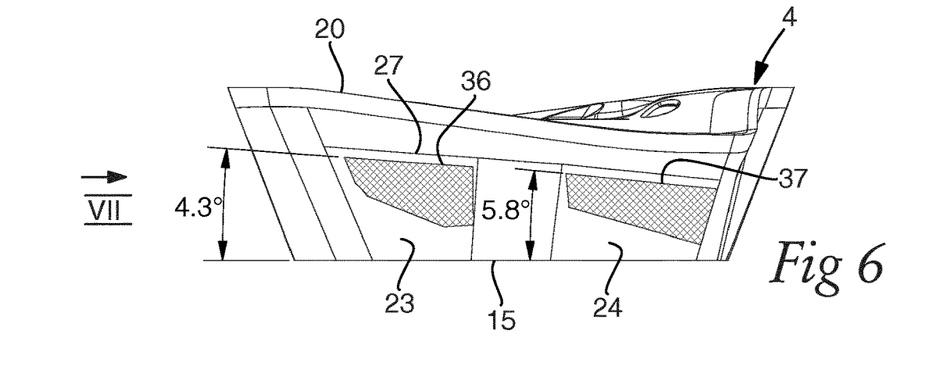
FIG. 6 shows the insert shown in FIG. 2 in a side elevation on the major side surface thereof.

It is shown in FIG. 6 that an upper border 27 forming a limit of the radial support surfaces 23, 24 most distant to the bottom surface 15 is inclined with respect to the bottom surface so that the distance of this border to the bottom surface increases in a direction of extension of the respective major cutting edge 20 towards the wiper edge 22 connected to this associated major cutting edge. It is shown how this inclination of the upper border 27 is 5.8° for the radial support surface 24 and 4.3° for the radial support surface 23 closest to the wiper edge 22. This inclination makes it possible to design the major cutting edge with a larger inclination with respect to the bottom surface 15 improving the cutting process and by that the quality of a shoulder wall obtained therethrough. This also means that radial forces will be better sustained by the radial support surface 23, since an upper support line thereof will be moved higher, i.e. further away from the bottom 15. This is particularly advantageous when the cutting depth increases, since the forces on the cutting edge is then also increasing and it is by then better to have support at a higher location.

Figure 7:
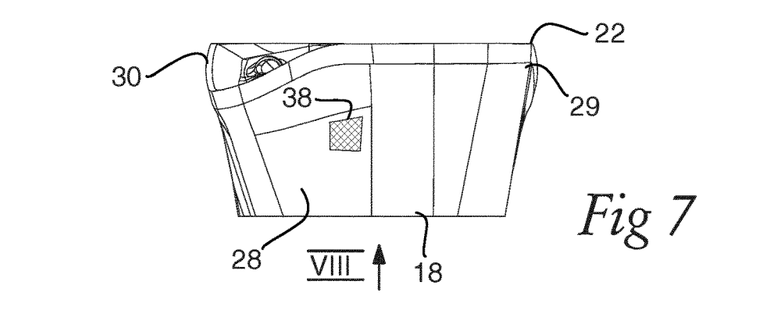
FIG. 7 shows the insert shown in FIG. 2 in a side elevation on a minor side surface thereof.

FIG. 7 illustrates how each minor side surface 18 of the insert is provided with an axial support surface 28, which is located more distant to an end 29 of this minor side surface having a wiper edge than an opposite end 30 of this minor side surface.

Each radial support surface 24, 25 most distant to said wiper edge 22 associated with a respective major cutting edge 20, 21 is inclined toward a longitudinal symmetry plane S of the insert as seen in a direction of the extension of the respective major cutting edge away from its associated wiper edge. This is understood when looking at FIG. 8, although the inclination is only 1.5° with respect to the symmetry plane S extending perpendicularly to the bottom surface 15 and dividing the insert into equal parts. This inclination optimizes the relief at the ends 31, 32 of the support surfaces 24 and 25 where such a relief is of most importance. Also each radial support surface 23, 26 of the major side surfaces closest to the respective wiper edge 22 is inclined towards said symmetry plane S as seen in a direction of the extension of the respective said major cutting edge towards its associated wiper edge. This inclination is here only 0.3° and do also positively influence the relief close to the respective wiper edge.

Figure 8:
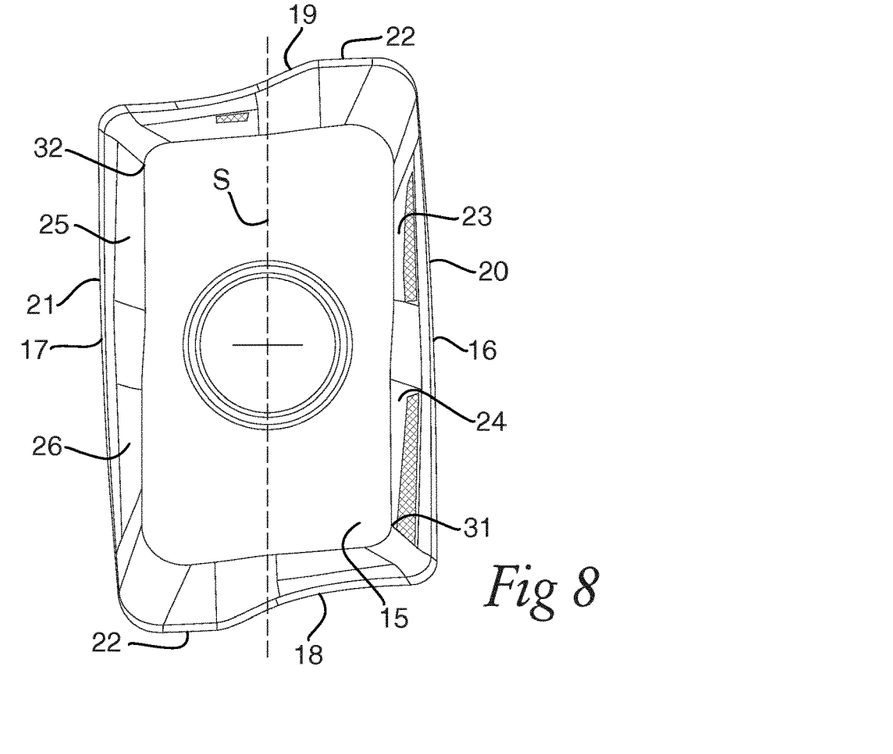
FIG. 8 shows a bottom view of the insert shown in FIG. 2.

Each major cutting edge 20, 21 has a slight camber by having a convex extension as seen perpendicularly to the bottom surface 15 as in FIG. 8. The result of such a camber has been explained further above.

Parts 33-35 of the different support surfaces which will bear against corresponding contact surfaces of the insert pocket are indicated by a grid pattern. The contact surfaces 11-13 of the insert pocket 3 of the tool have a border forming a limit of the support surfaces most distant to the base 10 of the pocket at a distance to this base being less than a distance of the corresponding upper border 27 forming a limit of the support surfaces 23-26 and 28 of the insert to the bottom surface of the insert, which will ensure that the contact surfaces 11, 12 and 13 will not bear against the insert above the upper limit of the respective support surfaces on the insert. The contact surfaces 11, 12 and 13 of the insert pocket will also make a smaller angle to a normal to the base 3 than the corresponding support surfaces of the insert to a normal to the bottom surface 15 thereof. This means that the forward radial contact surface 11 of the pocket will make an angle being less than 18° with respect to said normal, whereas the rear radial contact surface 12 will make an angle to said normal being less than 11°. This ensures that the support surfaces of the insert and the contact surfaces of the insert pocket will abut according to an upper support line 36-38 (see FIGS. 6 and 7).

Furthermore, the base 10 of the pocket 3 has a threaded bore 39 for receiving a screw 40 located slightly offset with respect to a through-hole 41 of the insert 4 enabling the screw 40 to urge support surfaces of the insert to bear under pretension against contact surfaces of the pocket when the screw is tightened and the bottom surface 15 of the insert is pressed against the base 10 of the pocket 3.

Figure 9:
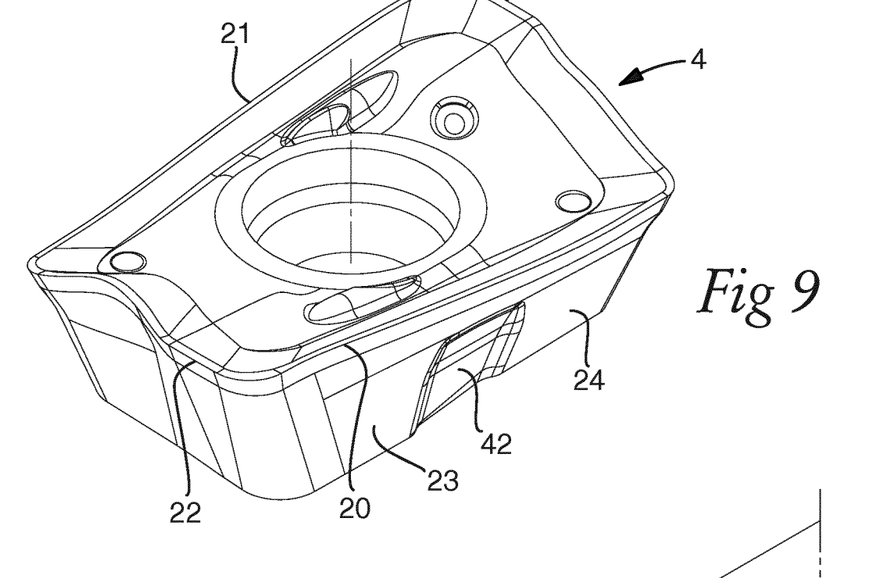
FIG. 9 shows a perspective view of an insert according to a second embodiment of the invention.

FIG. 9 shows a cutting insert 4 according to a second embodiment of the invention, which differs from the cutting insert according to the first embodiment shown in FIGS. 1-8 by a separation of the two support surfaces 23, 24 on the major side surfaces by a recess 42 instead of a continuously curved central transition surface 43 as in the first embodiment, and the same reference numerals have for that sake been used for both embodiments. The recess 42 may further ensure that no abutment of the central part of the major side surface in question on any part of an insert pocket will occur and erroneous abutment is thereby further avoided or distributed from the central part to the two support surfaces 23 and 24. For the cutting insert according to the first embodiment a recess 44 (se FIG. 1) may be provided in the insert pocket of the tool for avoiding such abutment of the central surface 43.

Figure 10:
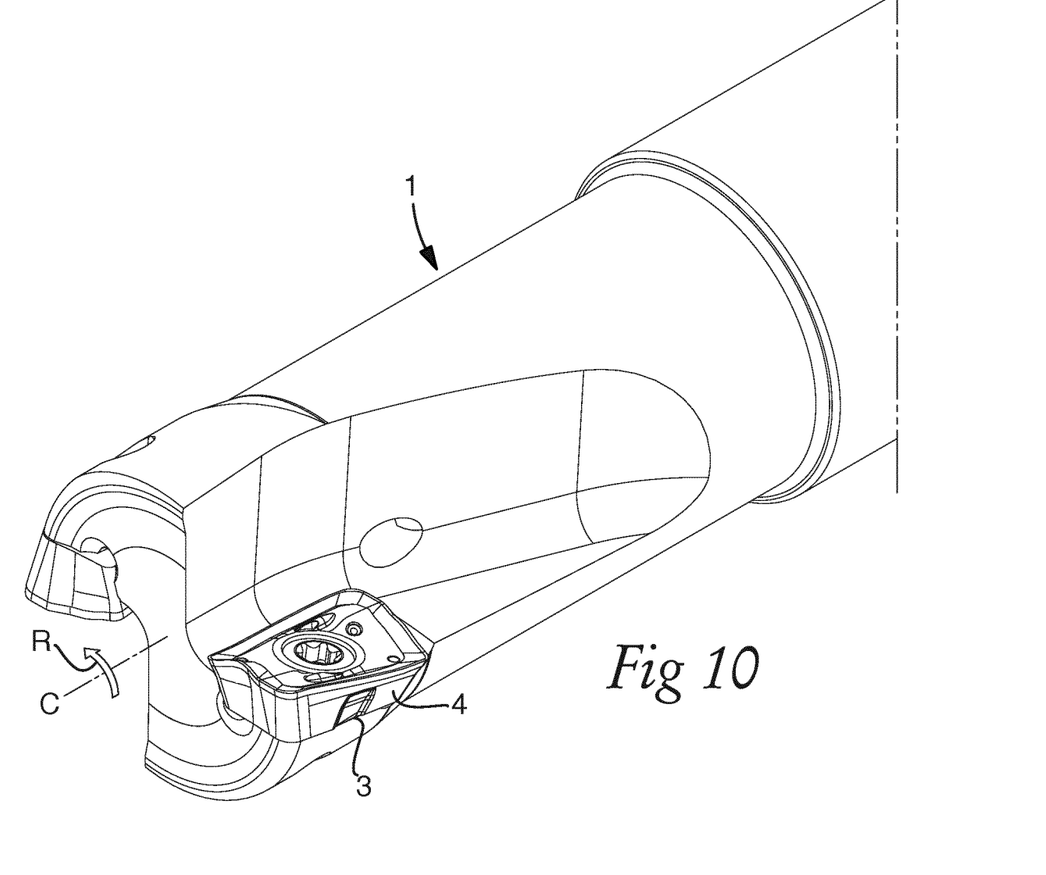
FIG. 10 is a view corresponding to FIG. 1 of a milling cutting tool according to the invention having an insert according to FIG. 9 secured in a pocket thereof.

FIG. 10 shows how an insert according to the invention in the form of an insert according the second embodiment is releasably fixed to the tool body 2 in the insert pocket 3 thereof. Thanks to said offset of the threaded bore 39 with respect to the through-hole 41 the radial support surfaces 25, 26 and the minor side axial support surface 35 will be urged under pretension against the contact surfaces 11-13 in the insert pocket, and thanks to the high locations of the support lines 36, 37 of the support surfaces 23-26, especially the support line 36, a lifting of the bottom surface 15 of the insert from the base 3 of the insert pocket will efficiently be counteracted, so that it is ensured that the insert is received in a stable predetermined fixed position in the insert pocket.

The invention is of course not restricted to the embodiments thereof described above, but many possibilities to modifications thereof would be apparent to a person with skill in the art without departing from the scope of the invention as defined in the appended claims.

The cutting insert according to the invention may have two pairs of opposing side surfaces provided with two opposing major cutting edges, so that the insert may then be indexed between four index positions. The two support surfaces of each such side surface of the insert will then in one of the index positions function as radial support and in another as axial support.

The invention claimed is:

1. A cutting insert for milling square shoulders, the cutting insert comprising:
   a top surface;
   a bottom surface; and
   a peripheral side surface extending between the top and bottom surfaces, the peripheral side surface including two pairs of opposing side surfaces, at least a first of said pairs of opposing side surfaces being provided with two opposing major cutting edges at an intersection of a respective side surface with the top surface and a second of said pairs of opposing side surfaces being provided with two opposing wiper edges at the intersection of the respective side surface with the top surface, each respective wiper edge being connected to its associated major cutting edge at one end of the respective side surface, each of said opposing side surfaces of said at least first pair of opposing side surfaces including two generally flat and non-coplanar support surfaces arranged consecutively with respect to a direction of an extension of a respective major cutting edge and making different angles with a normal to said bottom surface, wherein an upper border forming a limit of said support surfaces of each said side surface being most distant to said bottom surface is inclined with respect to said bottom surface so that the distance of said upper border to said bottom surface increases in a direction of extension of said major cutting edge towards said wiper edge connected to this associated major cutting edge.

2. The cutting insert according to claim 1, wherein the inclination of said upper border with respect to said bottom surface is 2° - 10°, 3° - 7° or 4° - 6 °.

3. The cutting insert according to claim 1, wherein the inclination of said upper border with respect to said bottom surface is larger, such as 1° - 4° or 1° - 2° larger, for each said support surface most distant to the respective wiper edge than for the respective support surface closer to said wiper edge.

4. The cutting insert according to claim 1, wherein each said support surface of the side surfaces provided with the major cutting edge most distant to the wiper edge associated with the respective major cutting edge makes a larger angle with a normal to said bottom surface than the respective support surface closer to said wiper edge.

5. The cutting insert according to claim 1, wherein said support surfaces make angles with a normal to said bottom surface of >8° or >10°.

6. The cutting insert according to claim 1, wherein each said support surface of the side surfaces provided with the major cutting edge closest to the wiper edge associated with the respective major cutting edge makes an angle with a normal to said bottom surface of <15° or <12°.

7. The cutting insert according to claim 1, wherein each said support surface of the side surfaces provided with the major cutting edge most distant to the wiper edge associated with the respective major cutting edge makes an angle with a normal to said bottom surface of ≥15° or 15° - 23° or 17° - 20°.

8. The cutting insert according to claim 1, wherein all said support surfaces extend to said bottom surface.

9. The cutting insert according to claim 1, wherein each said support surface of the side surfaces provided with the major cutting edge most distant to said wiper edge associated with the respective major cutting edge is inclined toward a longitudinal symmetry plane of the insert as seen in a direction of the extension of the respective said major cutting edge away from its associated wiper edge.

10. The cutting insert according to claim 9, wherein each said support surface inclined toward said symmetry plane is inclined at an angle of 1° - 4° or 1° - 2° with respect to said symmetry plane.

11. The cutting insert according to claim 9, wherein each said support surface of the side surfaces provided with the major cutting edge closest to said wiper edge is inclined toward said symmetry plane as seen in a direction of the extension of the respective said major cutting edge toward its associated wiper edge.

12. The cutting insert according to claim 1, wherein only one of said pairs of opposing side surfaces is provided with two said opposing major cutting edges, two of the side surfaces forming major side surfaces, the two other side surfaces forming minor side surfaces, and each said minor side surface including at least one generally flat support surface.

13. The cutting insert according to claim 12, wherein said support surface of each said minor side surface is located at a greater distance to an end of said minor side surface having a wiper edge than an opposite end of the minor side surface.

14. The cutting insert according to claim 1, wherein each said major cutting edge has a slight camber by having a convex extension as seen perpendicularly to said bottom surface.

15. A milling cutting tool comprising:
at least one cutting insert including a top surface, a bottom surface and a peripheral side surface extending between the top and bottom surfaces, the peripheral side surface including two pairs of opposing side surfaces, at least a first of said pairs of opposing side surfaces being provided with two opposing major cutting edges at an intersection of a respective side surface with the top surface and a second of said pairs of opposing side surfaces being provided with two opposing wiper edges at the intersection of the respective side surface with the top surface, each respective wiper edge being connected to its associated major cutting edge at one end of the respective side surface, each of said opposing side surfaces of said at least first pair of opposing side surfaces including two generally flat and non-coplanar support surfaces arranged consecutively with respect to a direction of an extension of a respective major cutting edge and making different angles with a normal to said bottom surface, wherein an upper border forming a limit of said support surfaces of each said side surface most distant to said bottom surface is inclined with respect to said bottom surface so that the distance of said upper border to said bottom surface increases in a direction of extension of said major cutting edge towards said wiper edge connected to this associated major cutting edge;
a tool body including a front end and a rear end, between which a central rotation axis extends around which the tool is rotatable in a direction of rotation, and at least one insert pocket formed in a transition between the front end and an envelope surface extending between the front end and the rear end of the tool body, said insert pocket including adjacent side and rear walls generally transvers to a base, the side wall being provided with two generally flat and non-coplanar radial contact surfaces arranged consecutively along the direction of said rotation axis in the form of a forward radial contact surface and a rear radial contact surface making different angles with a normal to said base and configured to form support for the support surface most distant to said wiper edge and the support surface closest to said wiper edge, respectively; and
a fastening device configured to secure said insert in said pocket while pressing said two insert support surfaces against said rear and forward radial contact surfaces of the pocket.

16. The cutting tool according claim 15, wherein said forward radial contact surface and said rear radial contact surface have an upper border forming a limit of these contact surfaces most distant to said base at a distance to said base being less than a distance of the corresponding upper border forming a limit of said support surfaces of each said insert side surface most distant to said bottom surface thereof to this bottom surface, such as being 80% - 95% of the latter distance.

17. The cutting tool according to claim 15, wherein said forward radial contact surface and said rear radial contact surface of said insert pocket make an angle with a normal to said base being smaller than the angle made by a said insert support surface to be pressed there against with a normal to said insert bottom surface such as by being ≥0.5° or 0.5°–2° smaller than that angle.

18. The cutting tool according to claim 15, wherein only one of said pairs of opposing side surfaces of the insert is provided with two said opposing major cutting edges, two of the side surfaces forming major side surfaces, the two other side surfaces forming minor side surfaces, and each said minor side surface including at least one generally flat support surface, said rear wall of the insert pocket including a generally flat axial contact surface configured to form an axial support to the insert.

19. The cutting tool according claim 15, wherein said insert pocket is configured to receive an insert having a central axial through-hole for securing it in the pocket by a screw, and that the base of the pocket has a threaded bore for receiving the screw located slightly offset with respect to said through-hole of the insert enabling said screw to urge support surfaces of the insert to bear under pretention against contact surfaces of the pocket when the screw is tightened and the bottom surface of the insert is pressed against said base of the pocket.

\* \* \* \* \*